United States Patent
Dorsey-Palmateer

[11] Patent Number: 5,450,147
[45] Date of Patent: * Sep. 12, 1995

[54] METHOD FOR CONTROLLING PROJECTION OF OPTICAL LAYUP TEMPLATE UTILIZING COOPERATIVE TARGETS

[75] Inventor: John W. Dorsey-Palmateer, Gig Harbor, Wash.

[73] Assignee: The Boeing Company, Seattle, Wash.

[*] Notice: The portion of the term of this patent subsequent to Aug. 23, 2011 has been disclaimed.

[21] Appl. No.: 113,456

[22] Filed: Aug. 27, 1993

Related U.S. Application Data

[63] Continuation-in-part of Ser. No. 951,603, Sep. 28, 1992, Pat. No. 5,341,183.

[51] Int. Cl.⁶ .................. G03B 21/00; G01B 11/24
[52] U.S. Cl. ......................... 353/28; 353/122; 356/376
[58] Field of Search ............... 353/28, 11, 121, 122; 356/375, 376, 386, 387, 380; 364/474.28, 474.29, 474.36, 474.37

[56] References Cited

U.S. PATENT DOCUMENTS

| | | |
|---|---|---|
| 2,543,561 | 2/1951 | Tracy . |
| 3,053,144 | 9/1962 | Harries et al. . |
| 3,377,915 | 4/1968 | Buckett . |
| 3,749,485 | 7/1973 | Carter et al. ............... 353/62 |
| 4,704,020 | 11/1987 | Murakami et al. ............... 353/122 |
| 4,714,331 | 12/1987 | Oda et al. ............... 353/122 |
| 4,739,487 | 4/1988 | Bonnet et al. ............... 364/475 |
| 4,818,098 | 4/1989 | Kahn et al. ............... 353/122 |
| 4,883,352 | 11/1989 | Bruning ............... 353/122 |
| 4,889,425 | 12/1989 | Edwards et al. ............... 356/152 |
| 4,957,369 | 9/1990 | Antonsson ............... 356/376 |
| 5,007,175 | 4/1991 | Schwarz ............... 33/286 |
| 5,237,384 | 8/1993 | Fukunaga ............... 356/376 |
| 5,341,183 | 8/1994 | Dorsey-Palmateer ............... 353/28 |

FOREIGN PATENT DOCUMENTS 640337 5/1976 U.S.S.R. .

OTHER PUBLICATIONS

Paper on the OLT presented to the Society of Manufacturing Engineers, Jan. 1993.

Primary Examiner—William A. Cuchlinski, Jr.
Assistant Examiner—William C. Dowling
Attorney, Agent, or Firm—Conrad O. Gardner

[57] ABSTRACT

A projection system having a process utilizing three-dimensional data, thereby allowing the system to account for rotational and translational differences between the projector and the object upon which the laser light is directed. Reference sensors located on the object are in a known relationship to the three-dimensional data set to be projected, i.e., the reference sensors utilize the same coordinate system as the three-dimensional set.

11 Claims, 4 Drawing Sheets

METHOD FOR CONTROLLING PROJECTION OF OPTICAL LAYUP TEMPLATE UTILIZING COOPERATIVE TARGETS

RELATED PATENTS APPLICATIONS

This is a continuation-in-part of U.S. patent application Ser. No. 07/951,603 filed Sep. 28, 1992 assigned to The Boeing Company.

BACKGROUND OF THE INVENTION

1. Field of the Invention

This invention relates to a rapidly scanned laser system that accurately identifies locations on an object, and more particularly, to a rapidly scanning laser system utilizing a three-dimensional (3-D) data set projected onto contoured surfaces.

2. Discussion of the Prior Art

U.S. Pat. No. 4,883,352 is directed to a galvanometer that scans flat patterns. U.S. Pat. No. 4,883,352 teaches that in critical applications, fine focus control can be accomplished via changes of laser wavelength. The device shown uses quadrant photodetector to actively compensate for relative lateral motion between the scanners and the site being scanned.

The present optical layup template (OLT) can be distinguished by noting that while galvanometer scanning is known, it is the improvements on that type of system which are of significance. The OLT does not use wavelength to control the focusing. It has a fixed focus and fixed wavelength laser. The quadrant photodetector for patent 4,883,352 is only designed to compensate for lateral movement. One embodiment of the OLT has at least three (and preferably six) quadrant detectors which will allow for compensation of lateral, depth, and rotational (pitch, yaw, and roll) motions. It is also apparent that the patent 4,883,352 system is also optimally designed for projection onto a flat or effectively flat (as seen by the galvanometer scanner) objects. The OLT, in contrast, is designed to project onto highly contoured parts, based upon information from a 3-D model of the projection pattern.

U.S. Pat. No. 4,818,098 relates to a projection system for flat pattern to flat pattern projection. It uses multiple image position sensors for determining planar rotational and translational shifts. (See column 7, lines 20, et seq.) The summary also mentions the use of graphics processor with means to receive a variety of graphics inputs form external sources and a vector generator to provide the desired scan positions for the servos (column 8, lines 20, et seq.).

The present OLT, in contrast, is designed to project 3-D images on contoured surfaces, rather than flat surfaces, as taught in patent 4,818,098. Planar projections are a degenerate condition for the OLT. The initial OLT had quadrant detector input to detect any relative movement of the projection object with respect to the projector, and is designed to correct for these rotations and translations. The multiple sensors in patent 4,818,098 are clearly designed to compensate only for planar rotations and transitions.

It is also apparent that the use of the graphics interface by patent 4,818,098 is designed to generate a flat pattern from another data set. Again, the present OLT can be contrasted in that it does not generate an intermediate flat pattern in order to determine the commands that are sent to the galvanometers. The advantage of the present system is that distortions which can be generated by applying 3-dimensional rotations to flat pattern algorithms can be totally avoided.

SUMMARY OF THE INVENTION

This invention relates to a rapidly scanning laser system that utilizes 3-D data sets and accurately identifies locations on an object. The rapidly scanning laser system is a laser spot which moves from location to location with sufficient speed to appear as a continuous, but flickering, line. This rapidly scanning laser is used for locating plies of material in the hand layup of composite parts and locating templates or paint masks during the painting of aircraft. The present system comprises a controller, a laser projector, and a data set defining the pattern to be projected. Reference locations on the object have the same coordinate system as the 3-D data set of the projected image, According to one embodiment these reference locations can be fitted with active sensors (quadrant detectors) or preferably cooperative targets which return the laser light back to the laser projector for detection, thus allowing the system to account for rotational and translational differences between the projector and object being projected upon. An algorithm is used to calculate the position and orientation of the projector relative to the reference sensors. Given the 3-D data set and the computed position of the projector, the horizontal and vertical angles corresponding to each point of the 3-D data set are calculated, and the projector is then sequentially pointed to each of the calculated positions. Various interpolation schemes smooth the motion of the galvanometers and reduce the following error of the control system. Information on ply material and orientation can also be projected. Key features of the present system include: numerical algorithms that control the manner in which the 3-D set is projected onto contoured surfaces and also computes the position of the laser projector relative to the projection surface. Technology for determining the positions of the reference locations which include active targets (quadrant detectors) on or adjacent to the projection surface, or cooperative targets on or adjacent to the projector surface, which return the laser light back to the laser projector by various schemes, thus allowing the streamlined calculation to occur. A further embodiment of this invention utilizes reference targets instead of the aforementioned active sensors (quadrant detectors).

DETAILED DESCRIPTION OF A FIRST EMBODIMENT OF THE INVENTION

This invention relates to a rapidly scanned laser system that accurately identifies locations on an object. (Rapidly scanned means a scanned laser spot which moves from location to location with sufficient speed to appear as a continuous line.) Two exemplary applications for this device are:

1. locating plies of material in the hand layup of composite parts.
2. locating templates or paint masks during the painting of an aircraft.

Another for a slowly scanned system is in identifying locations on an aircraft during assembly, e.g., locating stringer clips and shear ties on an aircraft during final assembly. (Slowly scanned means a stationary pointer which can be moved incrementally from point to point.)

Prior high speed scanning of laser light for the purpose of precision location of features has not been satisfactory in precision applications for many reasons, most notably:

Prior users have utilized algorithms requiring flat pattern projection as opposed to directly projecting three-dimensional (3-D) data. A requirement was that 3-D data first be converted into a flat pattern by assuming system constraints such as projector position and orientation; and second, introduction of a projection plane on which the flat pattern is generated. Thus, the flat pattern could only be accurately projected from one position. In a realistic environment, it is necessary to simplify and account for changes in an object's location and orientation with respect to the laser projector. This is necessary to simplify the initial alignment and subsequent adjustments for relative movement between the projector and target object. Algorithms which scale, skew, translate, and rotate flat patterns will not accommodate this requirement. A prior attempt was the installation of a translation stage in the projector head so that for a given application, the projector system will allegedly be self-correcting. This will not provide a functional projection system because translations alone will not correct for rotations which will occur.

Figure 1:
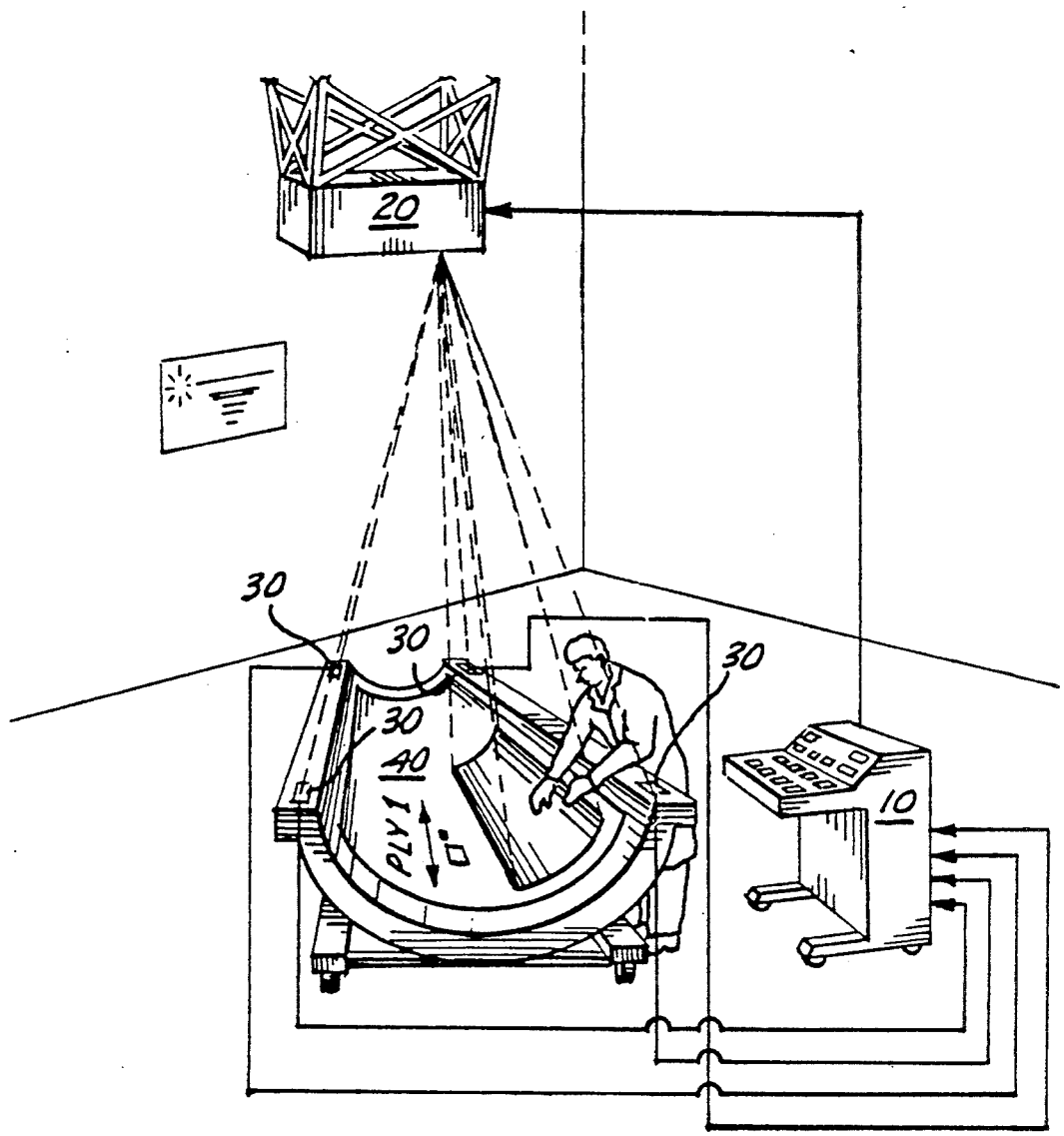
FIG. 1 is a perspective view of the present laser projection system showing an exemplary reference sensor system; and, FIG. 2 is a block diagram partially in circuit schematic of a reference sensor system coupled downstream from the reference sensors shown in FIG. 1 in accordance with a first embodiment of the invention;.

A laser projector comprises three major components, as shown in FIG. 1; and includes:

1. controller 10 (i.e., operator interface and projector driver);
2. a laser projector 20, having the data set defining the pattern to project; and,
3. reference sensors 30 positioned on the object 40;
4. their arrangement return and data set (controller) system.

This invention addresses inadequacies in projection systems via a process which is specifically designed to directly use 3-D data, and which will allow the system to account for rotational and translational differences between projector 20 on object 40 on which the laser light is pointed. In order to do this, however, it is necessary to have reference sensors 30 on object 40 that the laser light is pointed. Sensors 30 must be in a known relationship to the 3-D data set to be projected, i.e., reference sensors 30 should use the same coordinate system as the 3-D data set. FIG. 1 also shows target object 40 where the 3-D data set lays (in this figure a layup mandrel) and reference sensors 30 mounted on target object 40.

An abbreviated summary of the process includes the following steps:

1. Reference sensors 30 positions are measured (illuminated) with projector 20. The horizontal and vertical angles of the two scanners are recorded.
2. A computer algorithm is used to calculate the position and orientation of projector 20 relative to sensors 30 (see FIG. 2):

COMPUTER ALGORITHM $$\frac{(CH\ A - CH\ C)}{(CH\ A + CH\ C)} = \text{"Horizontal" Position Measurement}$$

$$\frac{(CH\ B - CH\ D)}{(CH\ B + CH\ D)} = \text{"Vertical" Position Measurement}$$

Where CHA and CHC, and CHB and CHD are opposite sides of the quadrant reference sensor.

3. Given the 3-D data set and the computed position of projector 20, the horizontal and vertical angles for each point of the 3-D data set are calculated.
4. Projector 20 is sequentially pointed to each of the calculated positions. Information on ply material and orientation can also be projected.
5. Periodically, reference sensors 30 positions are measured again to ascertain if there has been relative movement between them and projector 20. If movement is detected, steps 2, et seq., are executed again.

A key feature of the process is the numerical algorithm utilized in steps 2 and 3 infra. The equation solved is:

$$\tan(H) = \frac{m_{11}(X - x) + m_{12}(Y - y) + m_{13}(Z - z)}{m_{31}(X - x) + m_{32}(Y - y) + m_{33}(Z - z)}$$

$$\frac{\tan(V)}{\cos(H)} = \frac{m_{21}(X - x) + m_{22}(Y - y) + m_{23}(Z - z)}{m_{31}(X - x) + m_{32}(Y - y) + m_{33}(Z - z)}$$

where:
HAND V = horizontal and vertical angles projected.
X, Y, and Z = the position of projector 20.
Omega, Phi, and Kappa = the angular orientation of projector 20.
x, y, and z = the position of locations to be projected.
$m_{ij}$ = the angle cosines for the orientation of projector 20.

$m_{11}$ = cos(Phi) cos(Kappa)
$m_{12}$ = sin(Omega) sin(Phi) cos(Kappa) + cos(Omega) sin(Kappa)
$m_{13}$ = -cos(Omega) sin(Kappa cos(Kappa) + sin(Omega) sin(Kappa)
$m_{21}$ = -cos(Phi) sin(Kappa)
$m_{22}$ = sin(Omega) sin(Phi) sin(Kappa) + sin(Omega) cos(Kappa)
$m_{23}$ = cos(Omega) sin(Phi) sin(Kappa) + sin(Omega) cos(Kappa)
$m_{31}$ = sin(Phi)
$m_{32}$ = sin(Omega) cos(Phi)
$m_{33}$ = cos(Omega) cos(Phi)

The application of the above equation to step 2 is difficult because its inverse function must be formed. In order to do this, a first order Taylor series expansion for the variables X, Y, Z, Omega, Phi, and Kappa is written. Estimates of the variables are used in the Taylor expansion and a least squares analysis iterates to improve the solution. For this method to work, at least three reference sensors 30 are required; however, for practical application, at least six sensors should be used.

(Six sensors work well because it is best to spread the measurement and encoding errors over more than a minimum set of equations.)

The application of the algorithm to step 3 is straightforward. The position and orientation of projector 20 was computed in step 2, and the known positions for projection are then applied to the equation and the horizontal and vertical angles are computed.

Figure 2:
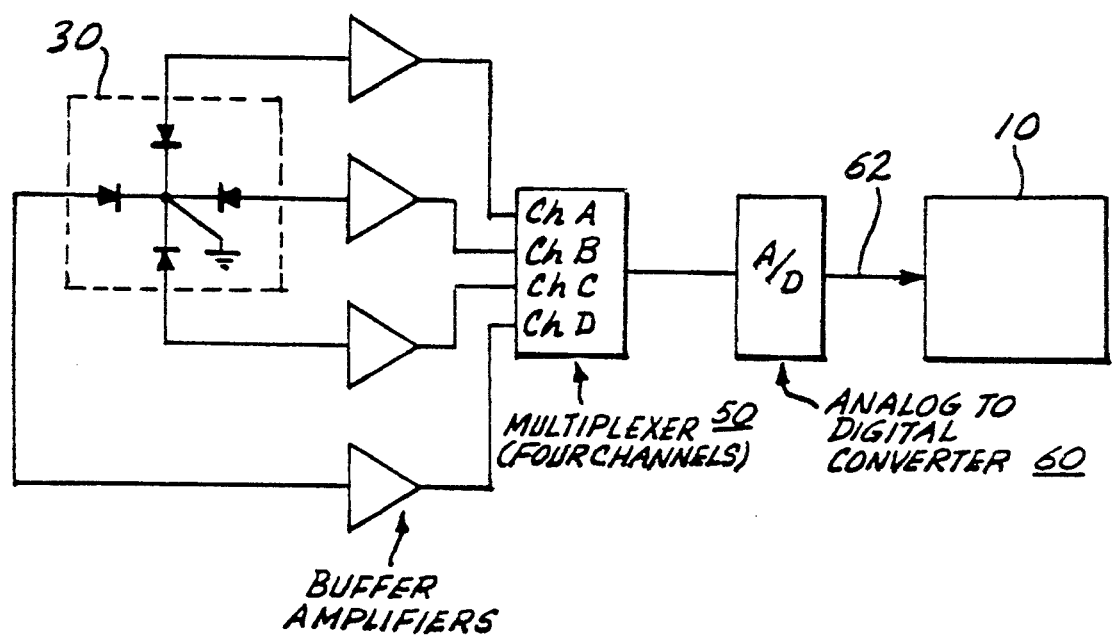

The design of the reference sensors may feature area measuring devices, such as CCD arrays (i.e., area arrays), and quadrant detectors. As such, these devices can be digital, analog, or a combination thereof. FIG. 2 shows an exemplary quadrant detector reference sensors system. The schematic shown in FIG. 2 is for analog sensors 30, which are converted downstream through multiplexer 50 and analog to digital converter 60 to digital signals 62. Algorithms in the computer at controller 10 perform automatic gain control (i.e., computations to reduce reference sensitivity to changes in laser power).

It is required that necessary reference sensors 30 be mounted on object 40 for which the projected pattern is designed. A practical method which can be used for doing this is to mount reference sensors 30 on the tool in a repeatable manner and then measure that location with another measuring system (e.g., computer-aided theodolites). The object (40) can also be fabricated with mountings for reference sensors (30).

The locating of reference sensors 30 can be partially automated. The operator will need to manually drive projector 20 to each sensor 30. Once the laser beam strikes the cell, an automated control system overrides the manual motion and drive the projected laser light to the center of the reference sensor. In such an automated system, a rotational transformation algorithm is required because the initial rotation of the sensor with respect to the orientation of the projector is unknown. This simplifies the operation and increases the accuracy.

Distortion compensation (i.e., pin cushion) should be compensated. Distortion compensation is utilized when computing the angles for projector 20. An inverse function for distortion is utilized when computing the location and orientation of the projector.

A CAD data file or measured data file is utilized to define the X, Y, and Z positions for laser projection. There are many optimal methods which may be utilized when recording this data for use in projecting the ply outline.

These several exemplary methods include:
1. defining a constant velocity path around the circumference of the ply.
2. defining points (e.g., equally spaced) around the periphery of the ply.
3. defining point to simulate eyebrows around the part.
4. defining equally spaced points around the circumference of the ply whose delay between each point is proportioned to the curvature at that point.

The selected exemplary method being number 3. Such method limits the amount of data which needs to be projected, and thus allows the speed for projection to increase, thereby reducing the apparent laser flicker.

DETAILED DESCRIPTION OF A SECOND EMBODIMENT OF THE INVENTION

The present invention relating to optical layup template (OLT) addresses inadequacies in existing projection systems designed to project ply information. Ply marking systems marketed are limited to two dimensional patterns, and are not capable of projection onto highly contoured surfaces. Furthermore, severe restrictions on the placement of the projector in these systems relative to the surface for projection makes the system cumbersome (locating pins are needed) and tooling expensive (fabrication personnel need to control the surface locations with respect to the underside of the tool where the locating pins seat). There is also a limit on the saving of factory labor because the use of sailcloth templates allow the hand marking of multiple plies so the template is not used for each addition of material to the layup.

The use of templates on highly contoured layup mandrels generally involves more complex templates. These templates are often comprised of an elastomeric material which is strengthened by a fiberglass substrate. Tooling is required to form these templates to the proper contour. Thus the cost of manufacturing the highly contoured templates is more than the simple flat templates. In addition, the weight of the templates is greater than that of sailcloth, thus making handling of the contoured templates more difficult. As a consequence, a projector to handle 3D information is of great importance.

The OLT is designed to project three dimensional information onto a surface. It is comprised of three main components:
1. The OLT controller.
2. The OLT projector head.
3. The reference targets.

The hereinbefore described first embodiment OLT used quadrant detectors rather than reference targets. The OLT controller according to the second embodiment hereinafter described, is designed to accept operator instructions, read data files containing xyz information and convert that data into horizontal and vertical angles, projectable information, for the OLT projector head. The controller also takes information from the OLT projector head regarding angular positions of the reference targets. This allows the controller to compute the position of the projector head relative to the reference targets. This is the key to the OLT since knowledge of the relative positions allows all point positions on the surface to be easily calculated and projected.

The OLT projector head is comprised of galvanometer scanners which steer a laser beam. Also included in the OLT projector are a modulator to control laser beam intensity, a telescope to expand and focus the laser beam, a beam splitter to separate a returning laser beam from the outgoing beam and onto a detector, and electronics to detect the returning laser beam.

The reference targets, or more generally, cooperative or retro-reflective targets are optical devices which have the characteristic of returning light in the same direction from whence it came. These devices can be corner cubes, retro-reflective materials, chrome tooling balls, etc. (The use of a plain mirror would not be a cooperative target because the light usually reflects off at a different angle.) The cooperative targets are positioned at the periphery of the layup surface so that all subsequent point computations for ply positions are "interpolations" from the positions of the reference targets.

Three or more reference targets are required, although there are diminishing accuracy benefits when more than seven reference targets are used.

The OLT has two major advantage over the flat pattern system:

1. It projects 3D information onto a contoured surface thus eliminating costly CLTs.
2. It uses cooperative targets to measure the relative position between the projector head and contoured surface and actively adjust the 3D projection to accommodate any relative movement, thus simplifying the tool process.

BACKGROUND

The OLT is not a measurement system. The OLT merely uses a laser to project CAD data defining part outlines onto an LM (layup mandrel) or other structure. To do this, the relative position between the OLT projector and LM must be known. Predefined reference positions are added to the LM for this purpose. Once the relative position is known, the CAD data for the outline is changed into horizontal and vertical angles for the OLT to project. It must be noted that the surface being projected upon is assumed to be accurate so the projected angles will circumscribe the correct shape. A simplified process flow is as follows:

1. Load Data (X Y Z) for Reference Positions.
2. Record the Horizontal and Vertical Angles of the Galvanometers to the Reference Positions.
3. Compute the Position (X Y Z Pitch Yaw Roll) for the OLT Projector
4. Load Data (X Y Z) for the Part Outline.
5. Compute the Horizontal and Vertical Angles for the Part Outline.
6. Project the Horizontal and Vertical Angles.

As can be seen, the reference positions are assumed to be correct. Angles to these positions are measured and a calculation determines the position and orientation (X, Y, Z, Pitch, Yaw, Roll) of the OLT projector.

SUMMARY OF COMPUTATION FOR 3D PROJECTION

The basic algorithm for computing the relationship between the projector galvarometers and projection surface is $$\begin{vmatrix} i \\ j \\ k \end{vmatrix} = |M| \times \begin{vmatrix} X_p - x_i \\ Y_p - y_i \\ Z_p - z_i \end{vmatrix}$$

where:

i,j,k are vectors from the internal angles of the projector head.

$X_p, Y_p, Z_p$ are the coordinates for the position of the projector head.

$x_i, Y_i, z_i$ are the coordinates of a point on the surface to be projected.

M is the angle cosine matrix.

Figure 3:
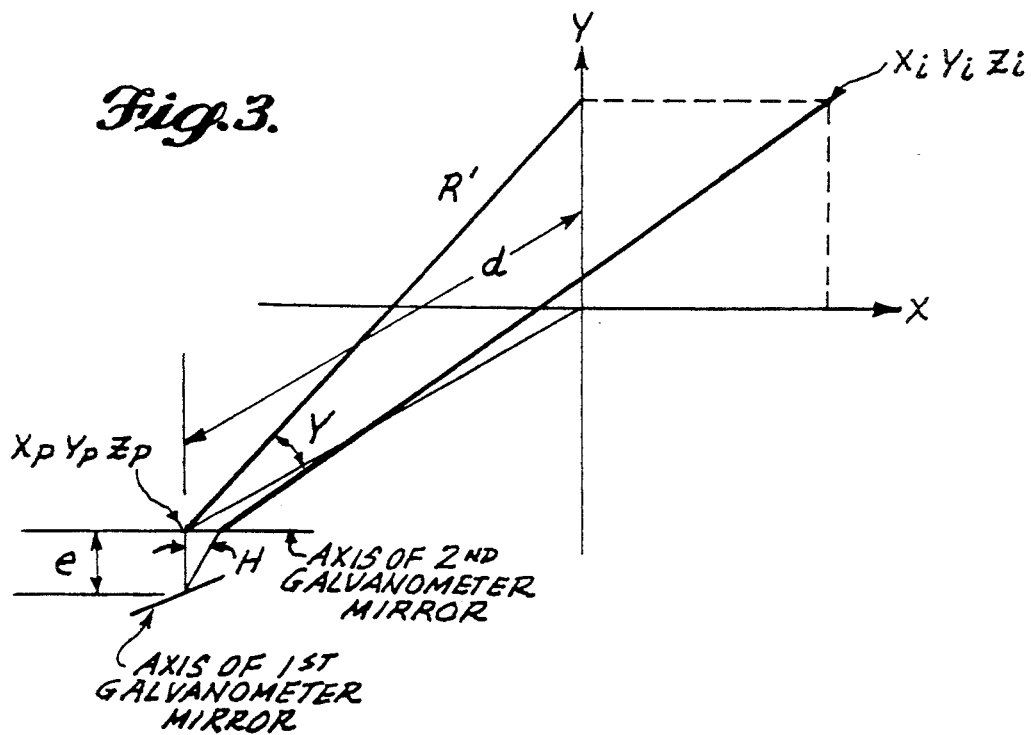
FIG. 3 is a geometric diagram for derivation of OLT equations.

FIG. 3 shows the geometric relationship of the above equation. From FIG. 3 it is apparent that the relationship of the internal angles of the projector to the i, j, k vector is a slightly modified spherical coordinate system:

$$\begin{aligned} k &= d \\ j &= d * \tan(V) \\ i &= e * \tan(H) + R' * \tan(H) \\ &= d * (e/d + 1/\cos(V)) * \tan(H) \end{aligned}$$

where:

H is the horizontal angle of the galvanometer.

V is the vertical angle of the galvanometer.

e is the separation of the horizontal and vertical galvanometers.

d is the distance from the galvanometer to the surface being projected upon.

The slight modification to the spherical coordinate system is in the i term and accounts for the separation of the horizontal and vertical galvanometers.

Three important things should be noted in these equations. First, all of the equations contain the factor d, which is unknown and must be removed. Second, the separation of the mirrors in the galvanometer is accounted for by the factor 'e'. (This latter correction removes the distortion mentioned in the first embodiment. Third, other optical and mechanical errors can be modeled and added to the i,j,k equations, for example squareness of axes galvanometer shaft to mirror alignment.

To use these equations function, the position of the projector is solved first. The equations are solved by dividing the i and j equations by k, and assuming initially that the separation e=0, thus eliminating the factor 'd'. The result are two non-linear equations:

$$\tan(v) = (m_{11}(X_p - x_i) + m_{12}(Y_p - Y_i) + m_{13}(Z_p - z_i))/(m_{31}(X_p - x_i) + m_{32}(Y_p - Y_i) + m_{33}(Z_p - z_i))$$

$$\tan(H)/\cos(V) = m_{21}(X_p - x_i) + m_{22}(Y_p - Y_i) + m_{23}(Z_p - z_i))/(m_{31}(X_p - x_i) + m_{32}(Y_p - Y_i) + m_{33}(Z_p - z_i))$$

These equations are linearized for the OLT projector positions and angle cosine matrices using a first order Taylor series expansion about an estimated answer. (See Appendix I for a C program listing of the generation of the partial derivatives.) The least squares methods for obtaining this solution are well documented in texts such as "Elements of Photogrammetry" by Paul Wolf or the "Handbook of Photogrammetry" published by the American Society of Photogrammetry and Remote Sensing.

To obtain a meaningful solution, three or more reference targets must be measured by the OLT projector head. These then generate an over determined least squares solution noted above. This is a predictor—corrector type whose corrections are for the projector position and angle cosine matrices.

Once the solution for e=0 is obtained, the computed value for d and measured value for e can be added to the above equations. The constant term in the second equation above changes from:

$$\tan(H)/\cos(V)$$

to $$\tan(H) * (e/d + 1/\cos(V))$$

Through each iteration the value for d is estimated and inserted into the constant term of the solution by using the original defining equation (1):

$$d = m_{31}(X_p - x_i) + m_{32}(Y_p - Y_i) + m_{33}(Z_p - z_i)$$

When the correction term of the predictor - corrector get sufficiently small, the solution has been obtained.

The process of obtaining the angles corresponding to a given OLT projector position and a set of xyz positions to project is straight forward:

V=arctan(i/k)
H=arctan(i/(e+sqrt($k^2+j^2$))

where i,j,k are computed from the original equations, (1) above.

There are several geometric compensations which must be corrected, and these have been modeled and included in the numerical methods for the OLT:
1. Linearity of galvanometers.
2. Squareness of axes.
3. Mirror to galvanometer shaft alignment.

The remaining geometric errors have been minimized by precision fabrication of the OLT projector.

The linearity of the galvanometers is accounted for by a look up table.

SUMMARY OF USE OF COOPERATIVE TARGETS AND DESIGN OF OLT HEAD REQUIRED TO IMPLEMENT THAT USE

The initial design (first embodiment hereinbefore described) of the OLT used active targets (quadrant detectors) to measure the location of the OLT projector head. This required wiring from the OLT controller to the object being projected upon. This is viewed as an impediment to the application of this technology since wires cause a tripping hazard and they take time to install and use. Furthermore, an algorithm was required to determine the rotation of the active targets with respect to the motion of the galvanometers.

These drawbacks are corrected through the use of cooperative targets in accordance with the second embodiment. (As stated previously, a cooperative target is an optical device which has the characteristic of returning light in the same direction from whence it came. These devices can be corner cubes, retro-reflective materials, chrome tooling balls, etc. ) Cooperative targets eliminate the wiring from the controller to the object being projected upon because the sensing devices are inside the OLT projector. Algorithms to determine the rotation of the active targets with respect to the motion of the galvanometers are not needed because the sensor is inside the OLT projector head and thus the geometrical relationship between the two is known a priori.

Several schemes were devised for measuring the laser light returning to the OLT projector. Three major schemes are:
1. The use of corner cubes and quadrant detector.
2. The use of cooperative targets with analog power signal returned from the OLT projector to the OLT controller.
3. The use of cooperative targets with digital power signal returned from the OLT projector to the OLT controller.

The advantage of the first method is that it is simple to implement (and was the first method demonstrated) because it has the most optical laser power returned to the OLT projector head and because the corner cube does not disperse the laser beam. When a null reading between opposite cells is obtained for the signal on the quadrant detector the correct center of the corner cube has been located. Furthermore, using the corner cube, the OLT controller can drive the galvanometers, with closed loop feedback, to the correct center of the corner cube. Drawbacks of this method are that the corner cubes tend to be large, bulky to mount, and their narrow acceptance angle makes them undesirable in a multiprojector system. If solid corner cubes are used there is also a displacement error caused by refraction of light within the corner cube if the corner cube is not pointed directly at the OLT projector.

The use of cooperative targets with an analog power signal returned to the OLT controller is a more difficult implementation. Cooperative targets tend to scatter the laser beam, thus making precise motions measurements with a quadrant detector impossible. The vicinity of the cooperative target is raster scanned and the centroid for the power return determines the correct center of the target. Advantages for this scheme are that cooperative targets such as photogrammetric targets are small (often the size of a shirt button) and they (photogrammetric targets) are wide angle so that adjacent projectors are able to use the same targets. (It should be noted that a corner cube could also be used as a cooperative target. ) A potential disadvantage is that the locating of the centroid is slower than the use of the quadrant detectors.

The use of cooperative targets with a digital power signal returned to the OLT controller is also a more difficult implementation. The difference between this and the previous method is that a digital signal, rather than analog signal, is returned to the OLT controller. A comparitor is used to convert the analog signal at the power detector into a one bit digital signal. The value of the comparitor can be set by either a digital signal from the computer or be configured in the electronic hardware. The comparitor circuit is also faster than an analog to digital converter used in scheme 2 above. An advantage is the wide dynamic range for the analog to digital comparitor circuits. A potential disadvantage is that finding the centroid of the cooperative target is limited by the speed of the raster scanning, and will be slower than using a quadrant detector.

Figure 4:
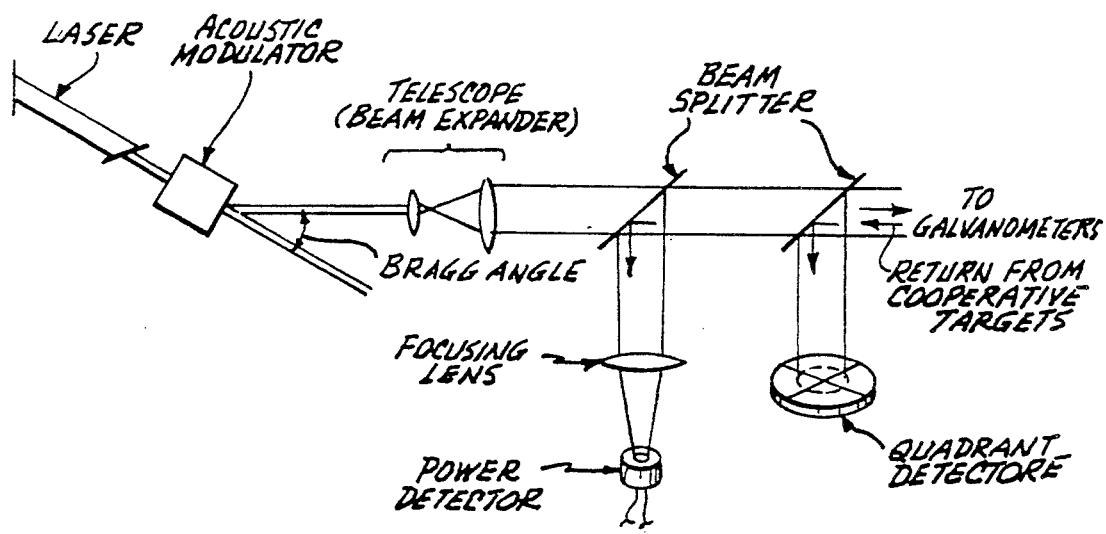
FIG. 4 shows an OLT projector system for obtaining measurements of the returning laser beam.

FIG. 4 shows the two general hardware schemes for obtaining measurements of the returning laser beam. The key to detection is the use of a pellicle beam splitter in the laser beam path. This allows the OLT projector to measure the position or power of the laser beam returned by the cooperative target. (An off axis detector system could be used to collect the returning light, however this scheme would not be effective if corner cubes are used since the returned beam is still collimated. ) Another important feature to note is that the OLT is a fixed focus system, whose focus is minimized at the average distance from the OLT projector to the layup surface. If an active focusing device were used, such as a galvanometer driven lens system, there would be a slower response time for focusing than for pointing the laser beam, thus slowing the projection speed.

From FIG. 4 it is evident that the laser is not aligned along the optical axis of the telescope. The acoustic modulator, used to modulate the laser beam itensity, is aligned so that the first order beam is aligned to the optical axis. This is a simple safety concern so that is the acoustic modulator is not energized, there will be no light transmitted by the OLT. This scheme does not a power penalty in that only about 60% of the light is transferred to the first order beam.

DETAILS FOR SCHEME 1, SUPRA

Figure 5:
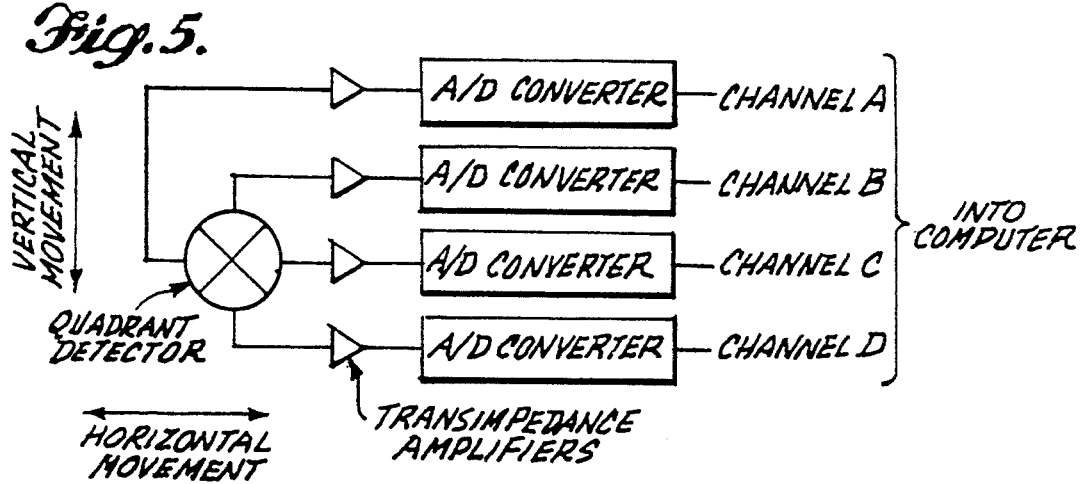
FIG. 5 is an electronic block diagram for quadrant detection of the return laser beam.

To effect the scheme 1 design the beamsplitter in FIG. 4 returns the laser beam to a quadrant detector. This scheme requires the use of corner cubes as the cooperative targets so that the return laser beam is cohesive and can be measured. FIG. 5 shows a diagram of the electronics which captures the return signal.

The quadrant detector is actually a two dimensional lateral effect cell. A standard quadrant detector could probably also be used. Notice there is no focusing lens in front of the lateral effect cell. If a quadrant detector is used, a focusing lens might be used to ensure that the return beam impinges on all of the quadrants of the detector. Four transimpedance amplifiers are used to convert the current from each of the detector quadrants to a voltage. Following this, analog to digital conversion is performed. Note that four A/D converters are used. The reason for this is to speed the A/D process. A single A/D converter and four channel sample/hold could be used. The vertical and horizontal signals for the return laser beam are then adjusted by an automatic gain control algorithm which adjusts for variations of returned light intensity:

Vertical=(B−D)/(B+D)

Horizontal=(A−C)/(A+C)

it is also obvious that a different types of signal processing can be performed, e.g., averaging several measurement, to obtain a better estimate of the vertical and horizontal measurements.

The closed loop correction for the center of the quadrant detector is performed by noting that the relative position of the return beam and the null center of the quadrant detector can be used to drive the galvanometers toward the null center. It is important to remember that the angles which are deflected by the galvanometers translate into different motions on the quadrant detector depending on the range between the galvanometers and the quadrant detector. This fact can set the maximum step size make by any move of the galvanometer. Also, the step size can be actively adjusted during closed loop operation by correlating the step size taken with the measured change on the quadrant detector and adjusting the step size accordingly.

DETAILS FOR SCHEME 2, SUPRA

Figure 6:
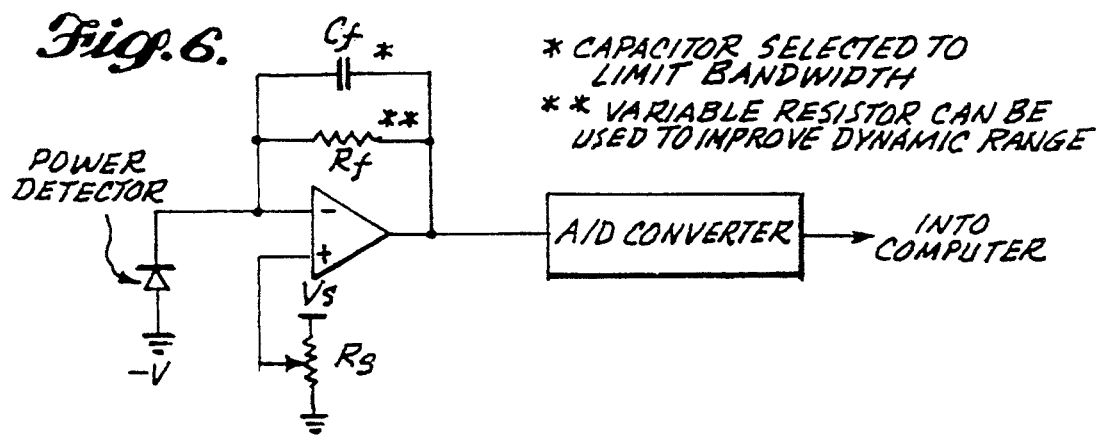
FIG. 6 is an electronic block and schematic diagram for power detector and cooperative target; and, FIG. 7 is a further electronic schematic for power detector and cooperative target.

FIG. 6 shows the electronics for the power detector and cooperative target. In general the value of $R_f$ is large because of the power loss from the cooperative target and the limited amount of light accepted back into the OLT head. The variable resistor, $R_s$, is used to offset the measurement for the ambient light (off the first reflection of the beam splitter). The value from the A/D converter is transmitted to the computer where additional signal processing is performed. The scheme for the power detector requires the galvanometers to raster scan the cooperative target, measuring the power at all the locations. The centroid is computed from all the data which is above some threshold. Other power centering schemes can be imagined such as fitting the power return to a paraboloid or other shape which takes into consideration the power level as well as the scan position.

DETAILS FOR SCHEME 3, SUPRA

Figure 7:
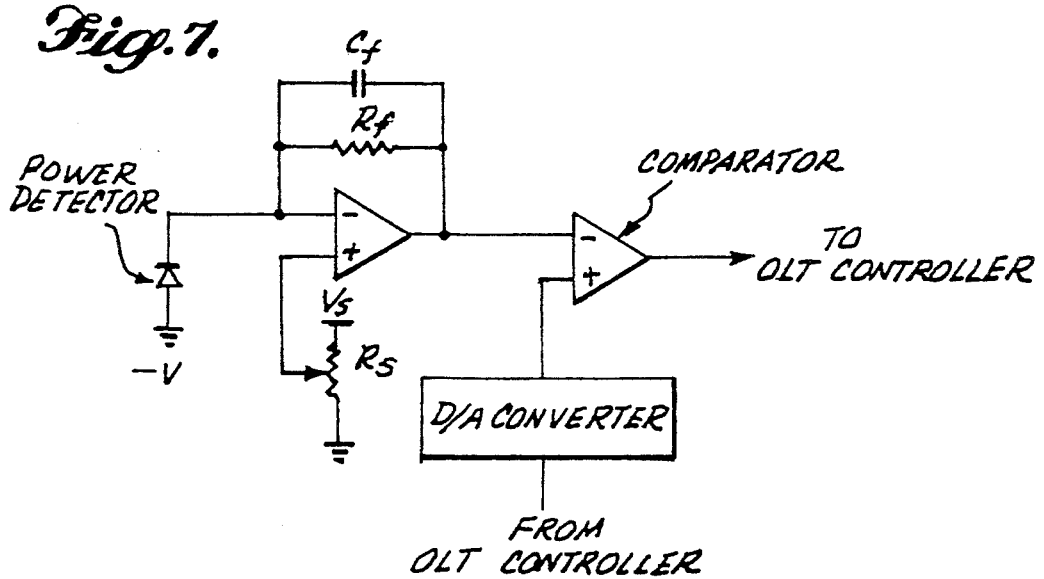

FIG. 7 shows the schematic for the power detection scheme which incorporates the analog comparator prior to sending a one bit digital signal to the computer. The threshold level for the comparator is derived from another digital signal from the OLT controller. Again, the offset into the transimpedance amplifier is adjusted to cancel the effect of ambient light from the first pass of the laser beam through the beam splitter. This system has not been tested. The scheme for the power detector requires the galvanometers to raster scan the cooperative target, measuring the power at all the locations. The centroid is computed from all the data which is above some threshold. Other power center schemes can be imagined such as fitting the power return to a paraboloid or other shape which takes into consideration the power level as well as the scan position.

In the first embodiment, the general equations:

$$\tan(H) = \frac{m_{11}(X - x) + m_{12}(Y - y) + m_{13}(Z - z)}{m_{31}(X - x) + m_{32}(Y - y) + m_{33}(Z - z)}$$

$$\frac{\tan(V)}{\cos(H)} = \frac{m_{21}(X - x) + m_{22}(Y - y) + m_{23}(Z - z)}{m_{31}(X - x) + m_{32}(Y - y) + m_{33}(Z - z)}$$

which relate to the horizontal and vertical angles of the galvanometer scanners for the projector (the left side of the equations) with the relative positions of the reference sensors and position and orientation of the Optical Layup Template (the right side of the equations). The equation has been improved to account for "pin cushion" distortion generated by the separation of the two mirrors of the galvanometer.

$$\tan(H) \times \left(\frac{e}{d} + \frac{1}{\cos(V)}\right) =$$

$$\frac{m_{11}(X - x) + m_{12}(Y - y) + m_{13}(Z - z)}{m_{31}(X - x) + m_{32}(Y - y) + m_{33}(Z - z)}$$

$$\frac{\tan(V)}{\cos(H)} = \frac{m_{21}(X - x) + m_{22}(Y - y) + m_{23}(Z - z)}{m_{31}(X - x) + m_{32}(Y - y) + m_{33}(Z - z)}$$

FIG. 3 is the sketch for these equations and also contains the definitions for the variables.

APPENDIX

The following is a solving engine written in C for computing and loading the partial derivatives for solving the position of the OLT projector head and the orientation of angle cosine matrix. Note that this derivation also contains information on adjusting for out of squareness of the horizontal and vertical galvanometers.

```
do
  (
  cosi = cos(ip);
  sini = sin(ip);
  cosj = cos(jp);
  sinj = sin(jp);
  cosk = cos(kp);
  sink = sin(kp);
  m00 = cosj * cosk;
  m01 = sini * sinj * cosk + cosi * sink;
  m02 = −cosi * sinj * cosk + sini * sink;
  m10 = −cosj * sink;
  m11 = −sini * sinj * sink + cosi * cosk;
  m12 = cosi * sinj * sink + sini * cosk;
  m20 = sinj;
  m21 = −sini * cosj;
  m22 = cosi * cosj;

/* loop to load and partials */ i=i2=i6=referencecount=0;
  while (i<ref_count)
    (
```

-continued
```
delx = (ref_ptr + i)−>x − xp;
dely = (ref_ptr + i)−>y − yp;
delz = (ref_ptr + i)−>z − zp;

k = m20* delx + m21 * dely + m22 * delz;
i = m00* delx + m01 * dely + m02 * delz;
j = m10* delx + m11 * dely + m12 * delz;

if (initialvalue == TRUE)
  xa = ((e + sqrt(k2 + j2))/q)
     * tan((ref_ptr + i)−>h_angle)
     + tam))ref_[tr + o)−>v_angle) * sin(OUTOFSQUARE);
else
  xa = sqrt(q*q + s*s) * tan((ref_ptr + i)−>h_angle)/q;
  ya = tan((ref_ptr + i)−>v_angle) *
    cos(OUTOFSQUARE);

*(a+i6+0) = (xa*(−m22*dely+m21*delz)
    + (−m02*dely+m01*delz))/q;
*(a+i6+1) = xa * (delx*coxj+dely+sini*sinj−delz*sinj*cosi)
    + (delx*sinj*cosk+dely*sini*cosj*cosk
    −delz*cosi*cosj*cosk))/q;
*(a+i6+2) = (m10*delx+m11*dely+m12*delz)/q
*a+i6+3) = (xa*m20+m00)/q;
*(a+i6+4) = (xa*m21+m01)/q;
*(a+i6+5) = (xa*m22+m02)/q;
b[i2++]=−(q*xa+r)/q;

i6 += 6;
*(a+i6+0) = (ya*(−m22*dely+m21*delz)
    + (−m12*dely+m11*delz))/q'
*(a+i6+1) = (ya * (delx*cosj+dely+sini*sinj−delz*sinj*cosi)
    +(delx*sinj*sink−dely*sini*cosj*sink +
    delz*cosi*cosj*sink))/q;
*(a+i6+2) = (−m00*delx−m01*dely−m02*delz)/q;
*(a+i6+3) = (ya*m20+m10)/q;
*(a+i6+4) = (ya*m21+m11)/q;
*(a+i6+5) = (ya*m22+m12)/q;
b[i2++] =_(q*yz+s)/q;
i6 += 6;
referencecount++;
)
i++;    /* increment to next reference */
)
```

What is claimed is:

1. A laser projection system comprising:
a laser light source for producing a coherent beam of light;
a telescope for expanding and focusing said laser beam;
a laser beam steering device for directing said laser beam at an object;
controlling means for controlling said beam steering device and deriving the angles which said beam steering device must point;
a plurality of reference targets, on or adjacent to said object for returning the laser light back to the said beam steering devices;
means for deflecting the returned laser light out of the outgoing optical path;
a single sensor for intercepting and detecting said reflected laser beam;
means connected to said sensor for detecting the laser beam impinging on the surface of said sensor;
means for determining the position and orientation of the beam steering devices with respect to said sensor; means for computing the angles required for said object, said three-dimensional data in the same coordinate system as said targets.

2. A laser projection system according to claim 1 wherein said targets are reflective reference targets.

3. A laser projection system according to claim 1 wherein said targets are cooperative targets.

4. A laser projection system according to claim 1 wherein said sensor is a single reference sensor.

5. A laser projection system according to claim 1 wherein said sensor is a power detector.

6. A laser projection system according to claim I wherein said means connected to said sensor for detecting the laser beam impinging on the surface of said sensor is arranged to detect the null position of the said laser beam impinging on the said surface of said sensor.

7. a laser projection system according to claim 1 wherein said means connected to said sensor for detecting the laser beam impinging on the surface of said sensor is arranged to detect the laser power of the laser beam impinging on the surface of said sensor.

8. A laser projection system comprising:
a laser light source for producing a coherent beam of light;
a telescope for expanding and focusing said laser beam;
laser beam steering devices for directing said laser beam at an object;
controlling means for controlling said beam steering devices and ascertaining the angles which said beam steering devices have pointed;
a plurality of reference sensors, on or adjacent to said object;
electronic means connected to said reference sensors for detecting the null position of the aforementioned laser beam impinging on the surface of said plurality of reference sensors;
means for determining the position and orientation of the said beam steering devices with respect to said plurality of reference sensors;
means for computing the angles required for said beam steering devices to project three-dimensional data onto the surface of said object, said three-dimensional data being in the same coordinate system as the said plurality of reference sensors.

9. A laser projection system according to claim 8 wherein said beam steering devices comprise an orthogonal pair of galvanometer driven mirrors.

10. A laser projection system according to claim 8 wherein said beam steering devices comprise accousto-optic devices.

11. In combination a laser projection system for projecting a three-dimensional data set onto the contained surface of an object;
an object;
a laser projector for projecting an image on said object;
a plurality of cooperative targets, said plurality of cooperative targets having the same coordinate system as the three-dimensional data set of said projected image.

* * * * *